United States Patent
Barrett et al.

(10) Patent No.: US 9,384,191 B2
(45) Date of Patent: Jul. 5, 2016

(54) WRITTEN LANGUAGE LEARNING USING AN ENHANCED INPUT METHOD EDITOR (IME)

(71) Applicant: International Business Machines Corporation, Armonk, NY (US)

(72) Inventors: Paddy Barrett, Dublin (IR); Andrew Penrose, Dublin (IR); Jing Zhang, Dublin (IR)

(73) Assignee: International Business Machines Corporation, Armonk, NY (US)

(*) Notice: Subject to any disclaimer, the term of this patent is extended or adjusted under 35 U.S.C. 154(b) by 192 days.

(21) Appl. No.: 14/036,251

(22) Filed: Sep. 25, 2013

(65) Prior Publication Data

US 2015/0088486 A1 Mar. 26, 2015

(51) Int. Cl.
| | |
|---|---|
| *G06F 17/27* | (2006.01) |
| *G06F 17/28* | (2006.01) |
| *G09B 19/06* | (2006.01) |
| *G06F 3/01* | (2006.01) |
| *G06F 17/30* | (2006.01) |

(52) U.S. Cl.
CPC ............ *G06F 17/2863* (2013.01); *G06F 3/018* (2013.01); *G06F 17/289* (2013.01); *G06F 17/3064* (2013.01); *G09B 19/06* (2013.01); *G06F 17/28* (2013.01); *G06F 17/3066* (2013.01); *G06F 17/30637* (2013.01); *G06F 17/30648* (2013.01); *G06F 17/30651* (2013.01); *G06F 17/30669* (2013.01)

(58) Field of Classification Search
CPC .................... G06F 17/30634; G06F 17/30637; G06F 17/3064; G06F 17/30643; G06F 17/30646; G06F 17/30648; G06F 17/30651; G06F 17/30654; G06F 17/30657; G06F 17/3066; G06F 17/30669; G06F 17/30672; G06F 17/21; G06F 17/2223; G06F 17/28; G06F 17/2863; G06F 3/018; G06F 17/275; G09B 19/06; G09B 19/08
See application file for complete search history.

(56) References Cited

U.S. PATENT DOCUMENTS

| | | | | |
|---|---|---|---|---|
| 6,014,615 A | * | 1/2000 | Chen ................................ 704/3 |
| 6,024,571 A | * | 2/2000 | Renegar ....................... 434/157 |
| 6,292,768 B1 | * | 9/2001 | Chan ................................ 704/1 |

(Continued)

FOREIGN PATENT DOCUMENTS

WO    WO 2014000267 A1 *  1/2014

OTHER PUBLICATIONS

Chinese-Tools, "Chinese Input Method Editor", retrieved on Jul. 2, 2013 from website: <http://www.chinese-tools.com/tools/ime.html/>.

(Continued)

*Primary Examiner* — Richard Zhu
(74) *Attorney, Agent, or Firm* — Daniel R. Simek; Maeve M. Carpenter

(57) ABSTRACT

A computer processor operating an input method editor (IME) receives an input of a phonetic word. The processor identifies one or more word characters corresponding to the phonetic word, wherein each of the one or more word characters represents one or more words of a first language. The processor translates each of the one or more word characters that correspond to the phonetic word into a second language, and the processor displays each of the one or more word characters of the first language and a translation into the second language of each of the one or more word characters of the first language.

18 Claims, 4 Drawing Sheets

(56) References Cited

U.S. PATENT DOCUMENTS

| | | | |
|---|---|---|---|
| 6,848,080 B1* | 1/2005 | Lee et al. | 715/203 |
| 7,478,033 B2* | 1/2009 | Wu et al. | 704/2 |
| 7,809,550 B1* | 10/2010 | Barrows | G06F 17/2223 704/257 |
| 8,137,105 B2* | 3/2012 | Chen | G09B 7/02 434/156 |
| 8,543,375 B2* | 9/2013 | Hong | G06F 17/2223 704/10 |
| 2005/0060138 A1* | 3/2005 | Wang | G06F 3/018 704/1 |
| 2006/0156257 A1* | 7/2006 | Chen | G09B 7/00 715/859 |
| 2009/0048821 A1* | 2/2009 | Yam | G06F 3/0486 704/3 |
| 2009/0081623 A1* | 3/2009 | Parkinson | G09B 7/00 434/169 |
| 2012/0029902 A1 | 2/2012 | Lu et al. | |
| 2012/0041752 A1 | 2/2012 | Wang et al. | |
| 2012/0089907 A1 | 4/2012 | Lin | |
| 2012/0194438 A1 | 8/2012 | Song et al. | |
| 2012/0296631 A1 | 11/2012 | Zhang et al. | |
| 2013/0289973 A1* | 10/2013 | Xiao | G06F 17/2223 704/3 |
| 2013/0342470 A1* | 12/2013 | Acar | 345/173 |
| 2014/0017652 A1* | 1/2014 | Perdreau | 434/322 |
| 2015/0106702 A1* | 4/2015 | Scott et al. | 715/265 |

OTHER PUBLICATIONS

English-Chinese Online Dictionary, retrieved from Jul. 2, 2013 from website: <http://dict.cn/en/>.

Google Translate, English to Chinese, retrieved on Jul. 2, 2013 from website: <http://translate.google.com/#zh-CN/en/>.

ICIBA, Chinese to English translation Online, retrieved on Jul. 2, 2013 from website: <http://www.iciba.com/>.

Li, "A Pinyin Input method Editor with English-Chinese Aided Translation Function", 2012 Conference on Computer Science and Service Sytem, IEEE Computer Society.

Online Pinyin Input Method, retrieved on Jul. 2, 2013 from website: <http://www.pinyinput.com/?lang=en>.

IBM W3C, "Input Method Editor API: W3C Working Draft 24", May 2012, retrieved from website: <http://www.w3.org/TR/2012/WD-ime-api-20120524>.

* cited by examiner

WRITTEN LANGUAGE LEARNING USING AN ENHANCED INPUT METHOD EDITOR (IME)

BACKGROUND OF THE INVENTION

The present invention relates generally to the field of language translation, and more particularly to translation utilizing a Romanization of an ideographic or "word character" language.

Use of online dictionaries, databases and search functions greatly enhance a user's ability to translate content from one language to another. However, written languages using large numbers of characters that represent words or morphemes, sometimes referred to as ideographic characters, herein referred to as "word characters", face complication when trying to provide input from standard computing input devices, such as a standard keyboard. Some languages, such as Mandarin Chinese, may have thousands of characters that can be used in written expression. Although there are several spoken dialects of Chinese, all use substantially the same written characters. The speed and efficiencies of online computer-based translation can be lost due to the inability to easily input numerous complex characters. In some cases, input devices may be equipped with radicals, which are symbol components of characters that represent the sounds comprising the pronunciation of a word character. The radicals are used to "build" word characters for input to applications or translation functions; however, this presents challenges for language learners that lack advanced understanding and familiarity with the pronunciation or radical component structure of word characters.

To facilitate translation of languages using word characters, phonetic Romanization has been used in which the phonetic pronunciation of the character is represented in Romanized or Latinized characters that are produced using the American Standard Code for Information Interchange (ASCII). Romanization or Latinization is the conversion of writing from a different writing system to the Roman (Latin) script. Methods of Romanization of written text include transliteration, converting text from one written type of script to another, and transcription, which is the systematic representation of language in written form. Transcription methods include phonemic transcription, which records the phonemes or units of semantic meaning in speech, and phonetic transcription, which records speech sounds with precision.

For Mandarin Chinese, for example, pinyin is a phonetic system for transcribing the sound of Chinese characters into Romanized script. Pinyin assists a learner of Mandarin Chinese to identify a Chinese character by the phonetic pronunciation of the Chinese character, whose sound is described by the transcribed Romanized script.

One issue in the use of pinyin or phonemic based scripts, is the number of homonyms that may exist for the same Latinized or Romanized (hereafter referred to as Romanized or Romanization), script characters. Many phonetic input systems use a multiple-choice method to address the homonym issue, presenting a candidate list of possible characters with the same pronunciation for each syllable entered, for selection by a user. For example, the pronunciation of "yi" in Mandarin Chinese can correspond to over 100 Chinese characters, which would generate a large list of characters from which a user must choose the most appropriate for the intended use.

BRIEF SUMMARY

Embodiments of the present invention disclose a method, computer program product, and system to improve learning of a language using an input method editor (IME). A computer processor receives an input of a phonetic word. The processor identifies one or more word characters corresponding to the phonetic word, wherein each of the one or more word characters represents one or more words of a first language. The processor translates each of the one or more word characters that correspond to the phonetic word into a second language, and the processor displays each of the one or more word characters of the first language and a translation into the second language of each of the one or more word characters of the first language.

DETAILED DESCRIPTION

Figure 1:
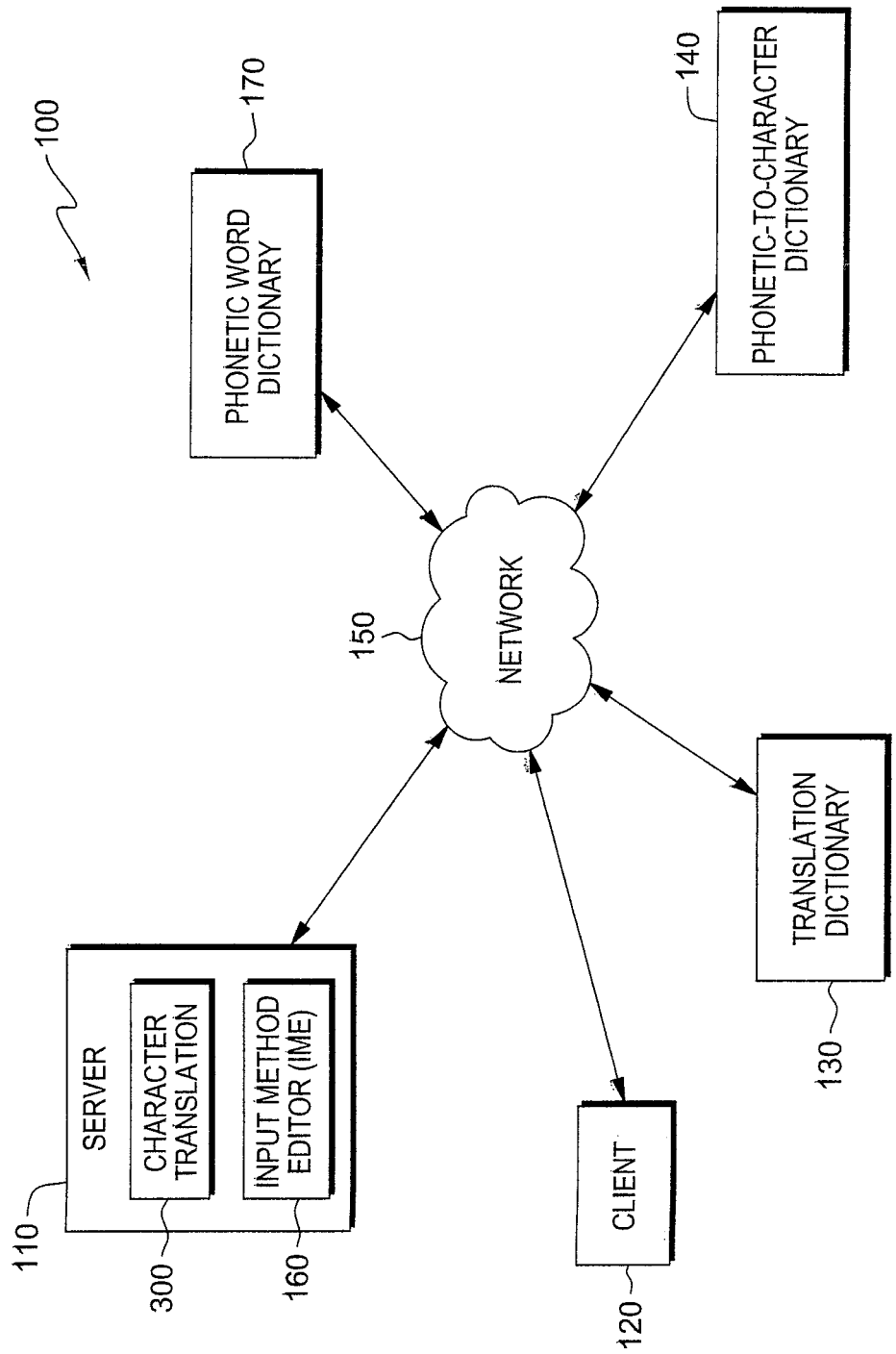
FIG. 1 is a functional block diagram illustrating a distributed data processing environment, in accordance with an embodiment of the present invention

Embodiments of the present invention recognize that input of phonetic Romanized characters to an input method editor, results in presentation of a listing of multiple homonym word characters. Further, recognition of the appropriate word character corresponding to the input phonetic characters may require advanced recognition of word characters, which is unlikely and problematic for new learners.

Embodiments of the present invention provide a method, system and computer program product for presenting the native language translation of the ideographic characters listed as a result of inputting phonetic Romanization of the target word character (using ASCII characters), as disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable storage devices may be utilized. A computer-readable storage device may be, for example, but not limited to, an electronic, magnetic, optical, electromagnetic, infrared, or semiconductor system, an apparatus, or a device, or any suitable combination of the foregoing. More specific examples (a non-exhaustive list) of a computer-readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage device may be any tangible device that can contain, or store program instructions for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with an embodiment of the present invention. Distributed data processing environment 100 includes server 110, client 120, translation dictionary 130, phonetic-to-character dictionary 140, and phonetic word dictionary 170, all interconnected through network 150.

Network 150 can be, for example, a local area network (LAN), a wide area network (WAN) such as the Internet, or a combination of the two, and can include wire or wireless connections. In general, network 150 can be any combination of connections and protocols that will support communications via various channels between server 110, client 120, translation dictionary 130, phonetic-to-character dictionary 140, and phonetic word dictionary 170, in accordance with an embodiment of the present invention.

Client 120 may be a desktop computer, laptop computer, a specialized computer server, a client computer, tablet, or netbook personal computer (PC), a personal digital assistant (PDA), a smart phone, a mainframe computer, or a networked server computer. Further, client 120 can represent computing systems utilizing clustered computers and components to act as single pools of seamless resources when accessed through network 150, as is common in data centers and with cloud computing applications. In general, client 120 is representative of any programmable electronic device or combination of programmable electronic devices capable of executing machine-readable program instructions. Client 120 may include internal and external hardware components, as depicted and described in further detail with respect to FIG. 4.

Server 110 is illustrated as including character translation program 300 and input method editor (IME) program 160. In one embodiment, character translation program 300 and input method editor (IME) program 160 may be installed on server 110 and accessed from client 120 via network 150. In another embodiment the programs may be installed on, and accessed directly from client 120. In yet another embodiment of the present invention, character translation program 300 and/or input method editor (IME) program 160 may be accessible by client 120 and/or server 110 via network 150.

Server computer 110 can be a desktop computer, laptop computer, a specialized computer server, a client computer, tablet, or netbook personal computer (PC), a personal digital assistant (PDA), a smart phone, a mainframe computer, a web server computer, or a networked server computer. Further, server 110 can represent computing systems utilizing clustered computers and components to act as single pools of seamless resources when accessed through network 150, as is common in data centers and with cloud computing applications. In general, server 110 is representative of any programmable electronic device or combination of programmable electronic devices capable of executing machine-readable program instructions. Server 110 may include internal and external hardware components, as depicted and described in further detail with respect to FIG. 4.

Input method editor (IME) program 160, referred to hereafter as IME program 160, is an application used for enabling a standard keyboard input device, such as a U.S.-101 keyboard, to be used to input symbols and characters that are not directly represented on the keyboard. IMEs are used extensively in countries whose written languages use word characters, such as Chinese, Japanese, and Korean languages. The advent of computing devices and the need to input language characters that number in the thousands created significant challenges for data and instruction input. IMEs help overcome these challenges by enabling keyboards and other input devices to input word characters to computing devices. In one embodiment of the present invention, IME program 160 receives input from a standard keyboard from which it determines one or more corresponding word characters.

To associate the input of a standard keyboard to word characters requires a translation of the phonetic counterpart of the word character(s) represented by the Romanization of the phonetic word. For example, a word character in Chinese has a pronunciation when spoken. The pronunciation of the word character is its phonetic word counterpart, and for Chinese, the collection of phonetic words corresponding to word characters of Mandarin Chinese is referred to as pinyin. For the Chinese language, pinyin words are used for keyboard entry, and are Romanized by using the ASCII characters of the alphabet of a standard keyboard to input a phonetic word representing the "sound" of the spoken word character. The word character associated with the Romanized phonetic word in pinyin is identified by a dictionary or database lookup. In many cases, due to tone and emphasis variations of the pinyin word, there are multiple word characters that are associated with the phonetic pinyin word. The operation of an IME program, such as IME program 160 will be discussed in greater detail with regard to FIG. 2.

Character translation program 300 is a program that in one embodiment of the present invention, works in conjunction with IME program 160 to provide a translation of displayed word characters. As described above, IME program 160 enables the use of standard keyboard input by entering the phonetic word using ASCII characters, to identify the corresponding word character. Since languages that use word characters may have numerous homonyms, the IME program 160 may determine multiple word characters that all correspond to the phonetic word entered. Character translation program 300 performs a translation lookup function that provides the translation of each of multiple word characters presented by IME program 160 as a candidate list, from which the user chooses. Character translation program 300 uses the lookup output of IME program 160 as input to a translation dictionary or database, and presents the translation adjacent to each of the word characters returned by IME program 160. This enables a user to quickly and precisely select the word character most appropriate for their intended use.

Phonetic-to-character dictionary 140 provides translation of a phonetic word to one or more corresponding word characters. Phonetic-to-character dictionary 140 receives a Romanized phonetic word that has been input, for example, from client 120 accessing IME program 160 on server 110, over network 150. Phonetic-to-character dictionary 140 uses the input phonetic word to lookup one or more corresponding word characters, and returns the one or more word characters to IME program 160 on server 110. A setup function of IME program 160 allows a user to select the language for the word character lookup, and determines the selection of phonetic-to-character dictionary 140 that corresponds to the selected language. For Mandarin Chinese, phonetic-to-character dictionary 140 is an existing pinyin dictionary, for example.

Translation dictionary 130 is an existing dictionary that translates word characters for a user-designated language into the native language of the user. The native language may be determined by the default language of the computing device of the user, or may be selected in a setup function of an IME. For example, translation dictionary 130 provides a translation of Mandarin Chinese word characters into the native language of a user of client 120, which may be, for example, English. When IME program 160 has identified a candidate list of word characters from a received phonetic word, translation dictionary 130 is used by character translation 300 to obtain a native language translation for each of the word characters identified by IME program 160.

IMEs require a phonetic word input to search for word characters having the pronunciation represented by the phonetic word. Students learning languages that use word characters may have little to no familiarity with pronunciation of the word characters. Phonetic word dictionary 170 is an existing dictionary that receives native language words and returns the phonetic word of the selected language that uses word characters, thus providing a student with a phonetic word for input to an IME.

Figure 2:
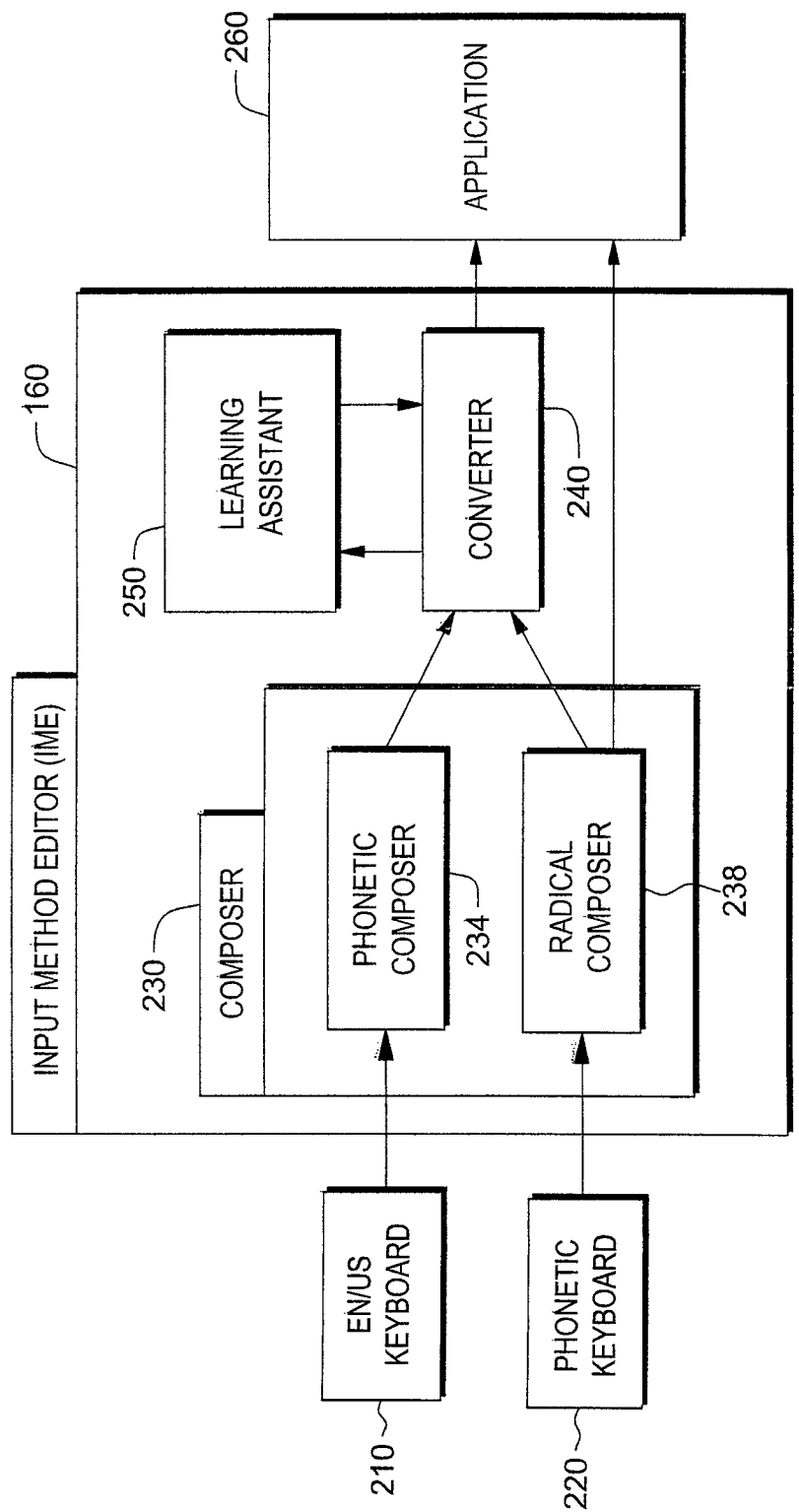
FIG. 2 is a functional block diagram illustrating an input method editor including character translation in accordance with an embodiment of the present invention.

FIG. 2 is a block diagram illustrating functional components of IME program 160, in accordance with an embodiment of the present invention. Typically, IME program 160 receives input from EN/US Keyboard 210, which is a U.S. English language standard keyboard that inputs ASCII characters. Alternatively, IME program 160 may receive input from phonetic keyboard 220 that inputs characters associated with specific sounds of a language.

IME program 160 includes composer 230, which is a context-free parser that composes non-ASCII characters (including phonetic characters) from keystrokes. Each language that uses word characters, such as Simplified Chinese, and Japanese, for example, uses a mapping table from its word character to a sequence of ASCII characters representing its pronunciation: e.g., 'か' to 'ka' in Japanese, and; 'ㄎ' to 'ka' in Simplified Chinese. This mapping table is called a romaji for Japanese and pinyin for Simplified Chinese, respectively. A phonetic composer, such as phonetic composer 234, uses mapping tables to compose a phonetic character from a sequence of ASCII characters produced by a US keyboard.

Similarly, radical composer 238 composes a phonetic character from phonetic radicals. Radical composer 238 is used for typing Traditional Chinese and Korean with phonetic keyboards. Each phonetic keyboard of these languages can produce phonetic radicals: e.g., typing 'r' produces 'ㅡㅣ' on a Korean keyboard; typing 'o' produces 'ㅅ' on a Traditional-Chinese (or Bopomofo) keyboard, etc. A radical composer composes a phonetic character from phonetic radicals given by phonetic keyboards.

Converter 240 is a context-sensitive parser used for replacing the outputs of a composer with word characters from languages such as Simplified Chinese, Japanese, and Korean. Because Chinese, Japanese, and Korean have many homonyms, each sequence of phonetic characters usually matches many word characters. Converter 240, using the phonetic character from composer 230, looks up word characters corresponding to the phonetic character and identifies a list of candidates of possible word characters from phonetic-to-character dictionary 140 (FIG. 1) and sends the list of candidate word characters to learning assistant 250.

Learning assistant 250 is a module that includes character translation program 300 (discussed with respect to FIG. 3), and is depicted as one embodiment of the present invention, as an integral component of IME program 160. In another embodiment, Learning assistant 250, including character translation program 300, works in conjunction with IME program 160, and is called by IME program 160, and may be connected to IME program 160 by physical or network connection. Learning assistant 250 receives the list of candidate word characters and accesses translation dictionary 130, which provides a native language translation for each word character of the candidate list. The candidate list of word characters is displayed to the user with the native language translation positioned adjacent to or in proximity of the corresponding word character, indicating association with the word character.

In one embodiment of the present invention, the native language into which the word characters are translated is a pre-selected option, in an alternative embodiment, the default language of the user's computing device is determined and used as the default language for translation.

In another embodiment of the present invention, the word characters in the candidate list are color-coded, providing information associating each word character of a specific color to a classification level for a language proficiency learning certification such as the Hanyu Shuiping Kaoshi (HSK) examinations, which are the Chinese language certifications for students. The color indication informs a student of word characters associated with various levels of a language certification and facilitates the learning process.

Application 260 is a user application for which the selection and use of a word character is intended. A word character from a candidate list provided by converter 240 is selected by a user and input to application 260.

Figure 3:
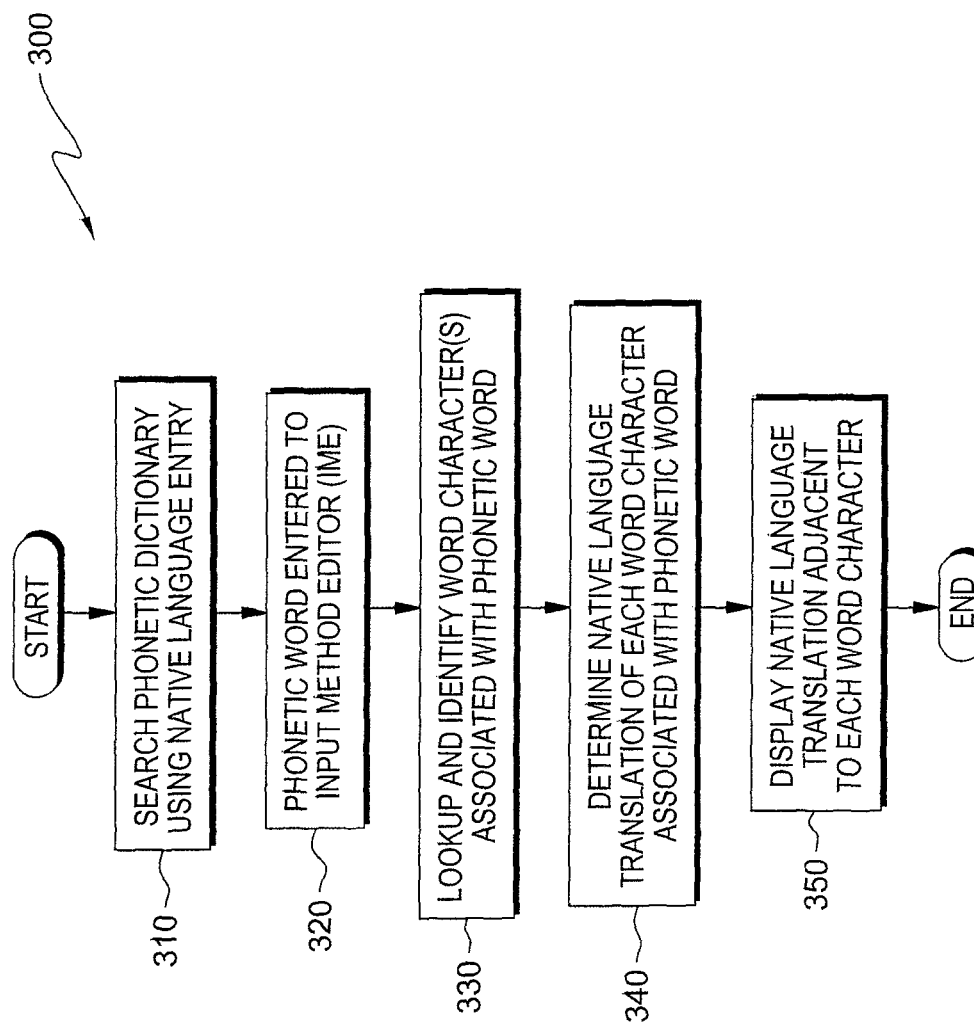
FIG. 3 is a flowchart illustrating the operational steps of a character translation program, working in conjunction with an input method editor within the environment of FIG. 1, in accordance with an embodiment of the present invention.

FIG. 3 is a flowchart illustrating the operational steps of character translation program 300, working in conjunction with an input method editor within the environment of FIG. 1, in accordance with an embodiment of the present invention. In one embodiment of the present invention, character translation program 300, working in conjunction with an IME, receives ASCII character input of a word in a native language. Character translation program 300 searches a phonetic dictionary using the native language entry (step 310). An IME uses a phonetic word, typically formed by representing the sounds or pronunciation of the desired word character in Romanized characters. Users new to the word character language may not be familiar with the proper pronunciation and may therefore not be able to input an accurate phonetic word to the IME. By connection and access to a dictionary that provides a phonetic word for the target word character language, by inputting a native language word, character translation program 300 obtains the desired phonetic word to input to IME program 160.

For example, a user new to Mandarin Chinese, wishes to determine a specific word character, but does not know the proper pronunciation of the word character. The user enters the native language version of the word in ASCII characters, in a search field provided by character translation program 300, which searches a pinyin dictionary, such as phonetic word dictionary 170, and returns the pinyin phonetic word to character translation program 300. The phonetic word can be displayed to the user for selection, learning and verification, or input directly into IME.

In an alternative embodiment, the user may be a student of a word character language, and in studying the language the user may be provided phonetic words to use to obtain the corresponding word character(s), and foregoes the dictionary search for the phonetic word. The phonetic word that is obtained is entered into the IME (step 320). The phonetic word may be input to the IME, for example IME program 160, by use of a standard keyboard, or if the phonetic word is obtained by use of a native language-to-phonetic dictionary, the phonetic word may be selected as input to the IME.

The IME, working in conjunction with character translation program 300, looks up and identifies the word character(s) associated with the phonetic word (step 330). The phonetic word is used by the IME to lookup and identify the one or more word characters using a phonetic-to-character dictionary, lookup table, or database.

For example, IME program 160, having received a phonetic word, submits the phonetic word to composer 234 that produces a phonetic character. The phonetic character is submitted to converter 240, which looks up and identifies one or more word characters associated with the phonetic word. In many cases, multiple homonyms may exist for a single phonetic word, and as such, more than one word character may be identified by converter 240. The result is often a list of candidate word characters from which the most appropriate is selected by the user.

Having identified a candidate list of word characters, character translation program 300 determines the native language translation of each word character associated with the phonetic word (step 340). Because multiple word characters may be associated with a single phonetic word, a candidate list of word characters may be identified. To further assist the language student that is not able to discern the appropriate word character from the candidate list, character translation program 300 accesses translation dictionary 130 and determines the native language translation for each of the word characters presented in the candidate list.

For example, converter 240 of IME program 160 has identified a candidate list of word characters for an entered phonetic word. Character translation program 300 receives the candidate list of word characters, and accessing translation dictionary 130, determines the native language translation for each word character of the candidate list. The languages for translation dictionary 130 is determined by a pre-selection of the target and native language, or alternatively, by selecting the target language and using the default language setting of the computing device of the user, for example, client 120 having a default language setting of English.

Having determined the native language translations, character translation program 300 displays the corresponding native language translation adjacent to each word character of the candidate list (step 350). Character translation program 300, displays the list of candidate word characters and the corresponding native language translation, such that the translation is placed adjacent to the corresponding word character. The user can easily determine and select the appropriate word character, based on the translations provided in the desired native language.

Having determined and displayed the native language translations for each of the word characters of the candidate list, character translation program 300 ends.

In one embodiment of the present invention, character translation program 300 color-codes the display of the word characters of a candidate list (in step 350). The color of a word character corresponds to a specified level of language proficiency certification and is determined by a look-up list as part of or working in conjunction with phonetic-to-character dictionary 140. In this manner, a language learner receives an indication of word characters associated with a certification level, by means of the color in which the word character is displayed.

For example, having submitted a phonetic word to phonetic-to-character dictionary 140, character translation program 300 receives the characters from phonetic-to-character dictionary 140 and performs a lookup function using a table of characters identifying the corresponding language certification level of the characters. The candidate listing of word characters, for example, may include 6 word characters of which 3 are displayed in a green color, 2 are in a red color and one is displayed in a blue color. The characters displayed in green are associated with a level 1 certification for the proficiency of the language, for example. The word character displayed in blue is associated with a level two proficiency certification, and the two red word characters are associated with a level three language proficiency. A user working towards a level two proficiency would be aware that they should recognize and understand the green and blue word characters.

In another embodiment of the present invention, character translation program 300 stores the word characters that are selected by a user from the list of candidate characters that are associated with the phonetic word that was input. Upon selection of an option to assist learning of word character recognition, character translation program 300 presents previously selected word characters, hiding the corresponding native language translation. The absence of the translation tests the recall of a user in recognizing the previously selected character.

For example, character translation program 300 presents a user with a candidate list of several word characters, each displayed with a native language translation adjacent to the corresponding word character. The user selects a word character from a candidate list that represents the word "house" in the user's native language, as indicated by the native language translation that is displayed adjacent to the word character. The user selects the word character corresponding to the native language translation of "house", and continues. On a subsequent input of a phonetic word, character translation program 300 produces a list of candidate word characters that includes the word character for "house" that the user previously selected. In this subsequent instance translation program 300 hides the native language translation for the word character corresponding to "house". By not displaying the native translation of the previously displayed word character the user is required to recall of the translation and meaning of the word character, thus facilitating learning.

Figure 4:
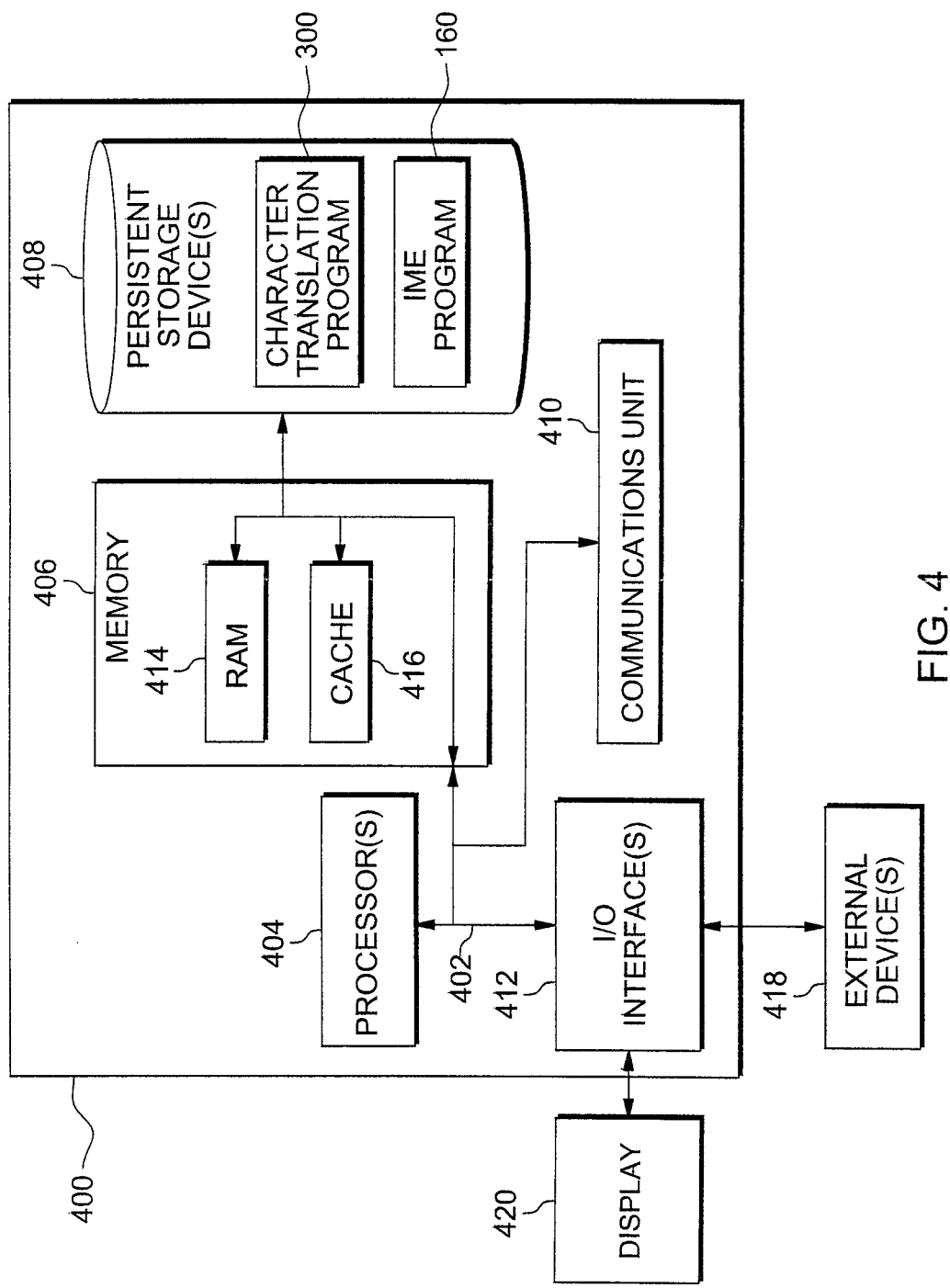
FIG. 4 depicts a block diagram of components of a computing device executing an IME program and character translation program, in accordance with an embodiment of the present invention.

FIG. 4 depicts a block diagram of components of computing device 400, capable of executing IME program 160 and character translation program 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

IME program 160 and character translation program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of data processing environment 100. In these examples, communications unit 410 includes one or more network interface cards. Communications unit 410 may provide communications through the use of either or both physical and wireless communications links. IME program 160 and character translation program 300 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., IME program 160 and character translation program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method to improve learning of a language using an input method editor (IME), the method comprising:
  a computer processor receiving an input of one or more words in a native language;
  the computer processor determining a phonetic word of a word character of a first language, the phonetic word corresponding to the one or more words that are received in the native language;

the computer processor displaying to a user, the phonetic word of the word character of the first language corresponding to the one or more words that are received in the native language;

in response to receiving a selection by the user of the phonetic word that is displayed, the computer processor submitting the phonetic word to an input method editor, wherein the input method editor identifies one or more word characters corresponding to the phonetic word, and wherein each of the one or more word characters represents one or more words of the first language;

the computer processor receiving the one or more word characters corresponding to the phonetic word, and determining a translation for each of the one or more word characters that correspond to the phonetic word into the native language; and the computer processor displaying each of the one or more word characters of the first language and the translation of each of the one or more word characters into the native language, to the user, wherein the one or more word characters of the first language are formatted to indicate an association with a classification level of a learning proficiency certification examination of the first language.

2. The method of claim 1, wherein the phonetic word corresponds to a word character of a first language that is composed from one or more phonetic radicals.

3. The method of claim 1, wherein the phonetic word is represented in Romanized characters and the first language is at least one of Chinese, Japanese, and Korean.

4. The method of claim 1, further comprising:
the computer processor searching for the phonetic word corresponding to one or more word characters of the first language by using an ASCII character input of a word in the native language; and
the computer processor inputting to the IME, the phonetic word corresponding to the one or more word characters of the first language.

5. The method of claim 1, wherein the native language is selected by a user or by a default language setting of a user computing device.

6. The method of claim 1, further comprising:
the computer processor displaying for selection by the user, each of the one or more word characters of the first language and the translation of each of the one or more word characters into the native language;
the computer processor storing the one or more word characters of the first language that are selected by the user; and
in response to the user selecting an option to hide translations of previously selected one or more word characters, the computer processor hiding the native language translations of the previously selected one or more word characters from a subsequent display of the one or more word characters of the first language.

7. The method of claim 1, further comprising:
in response to the computer processor automatically sending the phonetic word to the input method editor, the computer processor receiving from the input method editor, one or more word characters corresponding to the phonetic word, wherein each of the one or more word characters represents one or more words of the first language.

8. A computer program product to improve learning of a language using an input method editor (IME), the computer program product comprising:

one or more computer-readable storage device(s) and program instructions stored on the one or more computer-readable storage device(s), the program instructions comprising:
program instructions to receive an input of one or more words in a native language;
program instructions to determine a phonetic word of a word character of a first language, the phonetic word corresponding to the one or more words that are received in the native language;
program instructions to display to a user, the phonetic word of the word character of the first language corresponding to the one or more words that are received in the native language;
in response to receiving a selection by the user of the phonetic word that is displayed, program instructions to submit the phonetic word to an input method editor, wherein the input method editor identifies one or more word characters corresponding to the phonetic word, and wherein each of the one or more word characters represents one or more words of the first language;
program instructions to receive the one or more word characters corresponding to the phonetic word, and determine a translation for each of the one or more word characters that correspond to the phonetic word into the native language; and
program instructions to display each of the one or more word characters of the first language and the translation of each of the one or more word characters into the native language, to the user, wherein the one or more word characters of the first language are formatted to indicate an association with a classification level of a learning proficiency certification examination of the first language.

9. The computer program product of claim 8, wherein the phonetic word corresponds to a word character of a first language that is composed from one or more phonetic radicals.

10. The computer program product of claim 8, wherein the phonetic word is represented in Romanized characters and the first language is at least one of Chinese, Japanese, and Korean.

11. The computer program product of claim 8, further comprising:
program instructions to search for the phonetic word corresponding to one or more word characters of the first language by using an ASCII character input of a word in the native language; and
program instructions to input to the IME, the phonetic word corresponding to the one or more word characters of the first language.

12. The computer program product of claim 8, wherein the native language is selected by a user or by a default language setting of a user computing device.

13. The computer program product of claim 8, further comprising:
program instructions to display for selection by the user, each of the one or more word characters of the first language and the translation of each of the one or more word characters into the native language;
program instructions to store the one or more word characters of the first language that are selected by the user; and
in response to the user selecting an option to hide translations of previously selected one or more word characters, program instructions to hide the native language translations of the previously selected one or more word characters from a subsequent display of the one or more word characters of the first language.

14. A computer system to improve learning of a language using an input method editor (IME), the computer system comprising:
one or more computer processors;
one or more computer-readable storage medium(s);
program instructions stored on one of the one or more computer-readable storage medium(s) for execution by at least one of the one or more processors, the program instructions comprising:
program instructions to receive an input of one or more words in a native language;
program instructions to determine a phonetic word of a word character of a first language, the phonetic word corresponding to the one or more words that are received in the native language;
program instructions to display to a user, the phonetic word of the word character of the first language corresponding to the one or more words that are received in the native language;
in response to receiving a selection by the user of the phonetic word that is displayed, program instructions to submit the phonetic word to an input method editor, wherein the input method editor identifies one or more word characters corresponding to the phonetic word, and wherein each of the one or more word characters represents one or more words of the first language;
program instructions to receive the one or more word characters corresponding to the phonetic word, and determine a translation for each of the one or more word characters that correspond to the phonetic word into the native language; and
program instructions to display each of the one or more word characters of the first language and the translation of each of the one or more word characters into the native language, to the user, wherein the one or more word characters of the first language are formatted to indicate an association with a classification level of a learning proficiency certification examination of the first language.

15. The computer system of claim 14, wherein the phonetic word is represented in Romanized characters and the first language is at least one of Chinese, Japanese, and Korean.

16. The computer system of claim 14, further comprising:
program instructions to search for the phonetic word corresponding to one or more word characters of the first language by using an ASCII character input of a word in the native language; and
program instructions to input to the IME, the phonetic word corresponding to the one or more word characters of the first language.

17. The computer system of claim 14, wherein the native language is selected by a user or by a default language setting of a user computing device.

18. The computer system of claim 14, further comprising:
program instructions to display for selection by the user, each of the one or more word characters of the first language and the translation of each of the one or more word characters into the native language;
program instructions to store the one or more word characters of the first language that are selected by the user; and
in response to the user selecting an option to hide translations of previously selected one or more word characters, program instructions to hide the native language translations of the previously selected one or more word characters from a subsequent display of the one or more word characters of the first language.

* * * * *